3,345,239
METHOD FOR PRODUCING DECORATIVE ARTICLES OF MANUFACTURE
Theodore George Rochow, Darien, Conn., assignor to American Cyanamid Company, Stamford, Conn., a corporation of Maine
No Drawing. Filed Apr. 5, 1965, Ser. No. 445,692
14 Claims. (Cl. 161—1)

ABSTRACT OF THE DISCLOSURE

This invention relates to a method for producing diffusive, decorative articles of manufacture which comprises (1) admixing particles of a thermoplastic polymer with particles of at least one other compatible thermoplastic polymer having a different refractive index and (2) compression molding the resultant mixture to produce an article of manufacture having a thickness preferably at least as thick as the average particle size of the blended polymers. Still more particularly, this invention relates to diffusive, decorative articles of manufacture.

---

I have found that I can produce articles of manufacture which are optically attractive and have a smooth surface while being diffusive yet possessing excellent light transmissibility. I have found that these articles of manufacture can be produced by the method set forth more fully hereinbelow. The articles of manufacture have various properties which render them superior to commercially available materials of this type. That is to say, while being diffusive, they have a smooth surface and therefore do not attract dust and dirt as do the prior art materials which are rendered diffusive by surface conditioning, such as grinding, or by the addition of extraneous materials. Additionally, they have excellent light transmissibility and strength and therefore may be utilized in applications where prior articles fail due to the fact that they have been made diffusive by the addition of materials which reduce light transmissibility, physical strength and aesthetic appearance or by surface conditioning.

It is therefore an object of the present invention to provide a method for the production of diffusive, decorative articles of manufacture.

It is a further object of the present invention to provide a novel method for the production of decorative articles of manufacture which comprises (1) mixing particles of a thermoplastic polymer with particles of at least one other thermoplastic polymer, compatible therewith and having a different refractive index, and (2) compression molding the resultant mixture to produce an article of manufacture preferably as thick as the average particle size of the blended polymers.

It is a further object of the present invention to provide novel diffusive, decorative articles of manufacture.

As mentioned above, my novel method comprises compression molding a mixture of thermoplastic polymer particles. The polymer particle mixture which is molded is composed of one thermoplastic polymer and at least one other thermoplastic polymer which is compatible therewith. By the term "compatible" is meant that all the particles of the different thermoplastic polymers employed must be miscible or soluble in one another in the molten state. The molding process is such, however, that the two or more kinds of particles are not mixed to the extent of refractive homogeneity as perceived by the human eye. That is to say, the polymer particles are compression molded under conditions of pressure, temperature and time sufficient to fuse the particles of polymer to one another, but insufficient to form a homogeneous system. These conditions will, of course, vary for each polymer system employed, general discussion of which is set forth more fully hereinbelow. As mentioned above, it is preferred that the molded article have a thickness at least as thick as the average particle size of the polymers being molded. By "average particle size" is meant the numerical average between the diameter of the particles of each polymer measured at the short diameter.

Therefore, the initial thermoplastic polymers employed must be different from one another in their refractive index. Generally, it is permissible to begin with polymer particles which differ in refractive index by the fourth decimal place, the more diffuse articles being produced with polymers which differ in refractive index by the third or second decimal place. It is also preferred that the particles of polymer have practically the same softening points in order that all the various shapes of the particles may distort upon compression molding the polymer particle mixture. The gently diffusive, aesthetic effect achieved by my novel method is believed to result from a distortion of the particles which undergo compression molding such that the particles shape per se is not completely lost but is blended with or interfacially annealed with the other particles.

The particle sizes and shapes of the various polymers are not critical, however, I have found that particle size ranging from about 0.5 millimeter to about ¼ of an inch give optimum results. Various initial shapes which may be utilized include ovals, squares, pellets, cylinders, spheroids, etc., any other shape being as applicable.

Although more than two types of polymer particles may be blended according to my novel process, it is preferred that no more than three or four materials be utilized and that when any two polymers are blended, ranges from about 10% to 90%, by weight, and conversely 90% to 10%, by weight, based on the weight of the total blend, be utilized, with a preferred range of 25% to 75% and 75% to 25%, by weight, same bases, giving optimum results. The blending of three or more polymer materials should be proportioned within the sense of the above range, the lowest proportion of particles being of that polymer which distorts at the highest temperature.

The conditions of the compression molding step utilized in the instant invention, as mentioned above, depend upon the particles of polymer being molded. The pressure and temperature employed and the length of time the molding is conducted are those conditions generally known to those skilled in the art, however, pressures of from about 500 to about 3500 p.s.i., preferably 1700 to about 2500 p.s.i. and times ranging from about 5 to 60 minutes, preferably 10 to about 30 minutes are generally preferred. The temperature to which the compression molding is carried out must be at least the glass transition temperature of the polymer having the highest glass transition temperature. After compression molding, the mold is cooled by methods known in the art and the resultant product may be removed in a form ready for use.

The articles of manufacture may be colored by employing dyes or pigments or by utilizing particles of different colors initially. Optical color may also be introduced into the articles by utilizing particles of polymers which have materially different refractive indices at the extreme ends of the color spectrum. The resultant color effect is believed to be due to a refractive dispersion of the light into colors in the weldments between polymer particles. As mentioned above, my novel products exhibit a welding effect of grains of one polymer type flowing silghtly past and into a second polymer type much in the same manner as metal alloys are produced. No agitation of the particles occurs during the compression molding and therefore the refractive identity of each particle is not lost. The result is an array of refraction discontinuities which produce diffusive, aesthetic effects by transmitted light. These results are not obtained by known casting or known injection molding procedures.

Any resin which will weld with another resin of a different refractive index may be used in the production of my novel products and in my novel process. The most useful types of polymers are those which are transparent, thermoplastic and compatible with a multiplicity of other resin. A preferred group of resins are the homopolymers and copolymers of acrylic esters having the formula (I) 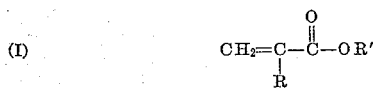

wherein R is hydrogen or a methyl radical and R' is an alkyl radical having from about 1–6 carbon atoms, inclusive. Examples of monomers represented by Formula I, above include methyl acrylate, ethyl acrylate, propyl acrylate, n-butyl acrylate, isobutyl acrylate, t-butyl acrylate, amyl acrylate, hexyl acrylate, methyl methacrylate, ethyl methacrylate, propyl methacrylate, n-butyl methacrylate, isobutyl methacrylate, t-butyl methacrylate, amyl methacrylate, hexyl methacrylate and the like.

Other resins which may be used include polystyrene and styrene copolymers, poly(acrylonitrile), poly(acrylamide), poly(vinyl chloride), poly(vinylidene chloride), cellulose acetate polymers, cellulose acetate-butyrate polymers, polyaldehyde resins, polyamines, polyamides, polyesters, alkyd-type resins, epoxy resins, amine-aldehyde resins, phenolaldehyde resins and the like.

Examples of monomers which may be copolymerized with the acrylate monomers of Formula I include other acrylate and methacrylate monomers, the styrenes such as styrene, α-methyl styrene, acrylonitrile, acrylamide and other well known acrylate comonomers such as those set forth in U.S. Patent No. 2,601,572.

The main criteria, as mentioned above, is that the polymers used differ in refractive index to the extent that light rays going through one type of particle welded to another type, will be bent or refracted. Colorless polymers such as poly(methyl methacrylate) and polystrene are therefore preferred because they may be used as such for efficient transmission-diffusion of white light or they may be stained any color for decorative, signaling or coding effects.

One specific commerical mixture I have found to give excellent results contains 50% of pellets of poly(methyl methacrylate) and 50% of pellets of a copolymer of styrene and methyl methacrylate. Another useful mixture employs 50% of pellets of a terpolymer of methyl methacrylate, acrylonitrile and styrene with 50% of pellets of poly(methyl methacrylate).

My novel products find use in decorative applications, advertising signs, panels and fixtures, juke boxes and dispensing machine panels, lighting fixtures, windows, skylights, shower screens, bathroom fixtures and other applications where light transmissibility is enhanced by diffusive and aesthetic patterns of refraction, color and luminescence.

Various fillers, additives, etc, such as UV absorbers, lubricants, antioxidants, dyes, pigments and the like may also be added to the polymer pellets before molding or to the molded articles before molding is complete without detracting from the novel properties indicated above.

The following examples are set forth for purposes of illustration only and are not to be construed as limitations on the present invention except as set forth in the appended claims. All parts and percentages are by weight unless otherwise specified.

*Example 1*

Fifty percent by weight of colorless poly(methyl methacrylate) pellets, having about a 3/16″ diameter and a 3/16″ height and a refractive index at 25° C. of 1.490, are added to 50%, by weight, of pellets of a colorless terpolymer composed of methyl methacrylate-acrylonitrile-styrene (71/19/10) having about a 3/16″ diameter and a 3/16″ height and a refractive index at 25° C. of 1.515, in a suitable mixing vessel. The vessel is sealed and placed on rollers for about 1 hour to thoroughly mix the contents. The resultant mixed pellets are then placed in a pre-heated (155° C.) round 4″ mold. The mold is heated by superheated steam and the pellets are melted in about 10 minutes under a pressure of 2100 p.s.i. to produce a 4″ disc having a thickness of about 3/16 of an inch. Cold water is then run through the mold for about 20 minutes to cool it sufficiently to release the molded product. The resultant product has a very smooth finish, high light transmission and a novel pleasant refractive appearance of schlieren. By virtue of the slightly different refractive index, the pellets of the terpolymer are individually discernible in the mold as a welded mass.

*Example 2*

The procedure of Example 1 is again followed except that the terpolymer pellets are transparently dyed orange prior to mixing with the poly(methyl methacrylate) pellets. Upon compression molding, the resultant product is similar to that of Example 1 except that orange pellets are vividly discernible in the solid welded molding, by virtue of their color as well as their difference in refractive index.

*Example 3*

The procedure of Example 1 is again followed except that the poly(methyl methacrylate) pellets are transparently dyed red and are mixed with the transparent terpolymer pellets. The resultant molded article is similar to that of Example 1 except that the transparent pellets are optically discernible in the red solid molding.

*Example 4*

Again following the procedure of Example 1, except that the poly(methyl methacrylate) is utilized in the form of 0.5 millimeter particles, results are achieved which are similar to those in Example 1 except that the terpolymer particles are more densely arranged in the molding but are still vividly, optically visible.

*Example 5*

The procedure of Example 1 is again followed except that the particles employed for the homopolymer are of random shape, i.e. are obtained by crushed cast sheet into fragments. The results are analogous to those of Example 1.

*Example 6*

Following the procedure of Example 1, except that a copolymer of methyl methacrylate and styrene (75/25) having a refractive index at 25° C. of 1.516, is substituted for the terpolymer, the resultant product is analogous in both chemical and physical appearance to that of Example 1.

*Example 7*

The procedure of Example 1 is again followed except that a copolymer of acrylonitrile and styrene (60/40) having a refractive index at 25° C. of 1.570, is substituted for the terpolymer. The resultant product is analogous to that of Example 1.

*Example 8*

The procedure of Example 1 is again followed except that poly(styrene) having a refractive index at 25° C. of 1.591 is substituted for the terpolymer. The resultant product is analogous to that of Example 1.

*Example 9*

The procedure of Example 1 is again followed except that one part per hundred of commercial blue pigment is placed in the mixing vessel and the resultant pigment-dusted particles are then molded according to the same procedure. The resulting molding is similar to that of Example 2 except that the total product is slightly pigmented (opacified) blue. The welded particles of terpolymer are still optically visible.

*Example 10*

The procedure of Example 1 is again followed except that the pellets of terpolymer are not pre-mixed with the pellets of poly(methyl methacrylate). The methacrylate pellets are first placed evenly over the bottom of the mold and portions of the terpolymer pellets are piled in the corners thereof. The resultant molding has the same appearance as that of Example 1 except that the design of the visible welded pellets is systemized instead of random.

*Example 11*

The process of Example 1 is again followed except that the molding prepared has a thickness of only 1/32 of an inch. Although the resultant product is thin, the aesthetic appearance persists. The individual pellets of terpolymer are still visibly discernible.

I claim:
1. A method of producing schlieric, diffusive, light transmitting, decorative articles of manufacture which comprises (1) admixing (A) particles of a synthetic, thermoplastic, vinyl polymer with (B) particles of at least one other synthetic, vinyl, thermoplastic polymer compatible with (A), said polymers having refractive indices differing from one another by the second, third or fourth decimal place and (2) compression molding the resultant mixture under conditions of pressure, temperature and time sufficient to weld the polymer particles to one another, but insufficient to form a homogeneous system, the refractive identity of at least one of said (A) and said (B) remaining substantially optically discernible.

2. A method according to claim 1 wherein the thickness of the resultant molding is at least as thick as the average particle size of the blended polymers.

3. A method according to claim 1 wherein at least one of the polymers is a polymer of methyl methacrylate.

4. A method according to claim 2 wherein at least one of the polymers is a polymer of methyl methacrylate.

5. A method according to claim 1 wherein one of the polymers is poly(methyl methacrylate) and the other polymer is a copolymer of methyl methacrylate.

6. A method according to claim 2 wherein one of the polymers is poly(methyl methacrylate) and the other polymer is a copolymer of methyl methacrylate.

7. A method according to claim 1 wherein the particles range in size from about 0.5 millimeter to about 1/4 of an inch.

8. A method according to claim 2 wherein the particles range in size from about 0.5 millimeter to about 1/4 of an inch.

9. A method according to claim 1 wherein said compression molding is conducted at a pressure ranging from about 500 to about 3500 p.s.i., a contact time ranging from about 5 to 60 minutes and a temperature of at least a glass transition temperature of the polymer having the highest glass transition temperature.

10. A method of claim 2 wherein said compression molding is conducted at a pressure ranging from about 500 to about 3500 p.s.i., a contact time ranging from about 5 to 60 minutes and a temperature of at least a glass transition temperature of the polymer having the highest glass transition temperature.

11. A schlieric, diffusive, light-transmitting article of manufacture composed of a compression molded mixture of (A) particles of a synthetic, vinyl, thermoplastic polymer and (B) particles of at least one other synthetic, vinyl thermoplastic polymer compatible with (A), said polymers having refractive indices differing from one another by the second, third or fourth decimal place, said (A) and (B), in said article being welded to one another, the refractive identity of at least one of said (A) and said (B) remaining substantially optically discernible.

12. An article of manufacture according to claim 11 wherein at least one of the polymers is a polymer of methyl methacrylate.

13. An article of manufacture according to claim 11 wherein one of the polymers is poly(methyl methacrylate) and the other polymer is a copolymer of methyl methacrylate.

14. An article of manufacture according to claim 11 wherein the particles range in size from about 0.5 millimeter to about 1/4 of an inch.

References Cited

UNITED STATES PATENTS

| | | | |
|---|---|---|---|
| 1,465,545 | 8/1923 | Demongeot | 65—18 |
| 2,154,438 | 4/1939 | Conklin. | |

ROBERT F. WHITE, *Primary Examiner.*

J. R. HALL, *Assistant Examiner.*